United States Patent Office 3,306,896
Patented Feb. 28, 1967

3,306,896
AMINO DERIVATIVES OF 2-STILBAZOLE
William T. Ely, Livonia, Mich., assignor to Parke, Davis & Company, Detroit, Mich., a corporation of Michigan
No Drawing. Filed Oct. 10, 1963, Ser. No. 315,409
5 Claims. (Cl. 260—240)

The present invention relates to new organic nitrogen compounds. More particularly, it relates to new organic nitrogen compounds of the formula

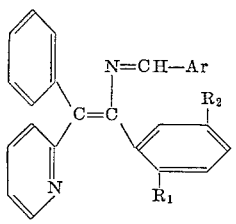

to acid-addition salts thereof, and to methods for their production; where Ar represents phenyl, o-hydroxyphenyl, benzyl, or 2-hydroxy-1-naphthyl, $R_1$ represents methyl or methylthio, and $R_2$ represents hydrogen or methyl.

In accordance with the invention, compounds having in the forms of their free bases the foregoing formula are produced by reacting an aminostilbazole compound which can be represented by the formula

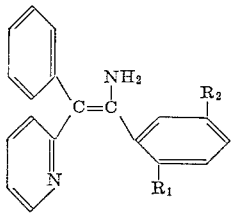

with an aldehyde of the formula

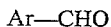

Ar—CHO where Ar, $R_1$ and $R_2$ are as defined before. The reaction can be carried out either in the absence of a solvent or in the presence of an unreactive solvent. Some examples of suitable unreactive solvents are lower alkanols such as methanol, ethanol and isopropyl alcohol; ethers such as dioxane, tetrahydrofuran, diethylene glycol dimethyl ether, and ethylene glycol monoethyl ether; other unreactive solvents such as N,N-dimethylformamide; and mixtures of the foregoing. A preferred solvent is a lower alkanol, especially ethanol. Approximately equimolar quantities of the aminostilbazole compound and the aldehyde are normally employed although up to a moderate excess of either reactant can be used. The process is usually carried out at a temperature between approximately 50 and 150° C., the preferred temperature in the absence of a solvent being about 95–100° C. and the preferred temperature with ethanol as a solvent being the reflux temperature of the reaction mixture. Under the preferred temperature conditions, the reaction is substantially complete within less than ten hours and the usual reaction time is about one to four hours. The product is isolated directly as the free base or, following treatment with an acid, as an acid-addition salt.

Although the starting materials employed in the process of the invention have been represented as aminostilbazole compounds, this is only one of the equivalent tautomeric forms in which these compounds can exist. The facile interconversion between the aminostilbazole compounds and their tautomeric forms is illustrated by the following equation.

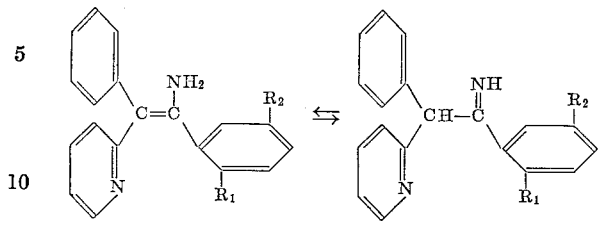

cis and trans isomers

One of the indicated tautomeric forms, that is the cis enamine, the trans enamine, or the imine, may be favored by such factors as acidic or basic conditions or solvent, although the process of the invention can be visualized as occurring by condensation of the amino group and the aldehyde group, with elimination of water. For reasons of convenience, these starting materials are consistently formulated and named as having the amine structure but because of the equilibrium state which can exist among the tautomeric forms, it will be appreciated that the amine structure includes the various tautomers indicated above. For purposes of chemical nomenclature, the foregoing starting materials as well as the products of the invention can be regarded as amino derivatives of 2-stilbazole,

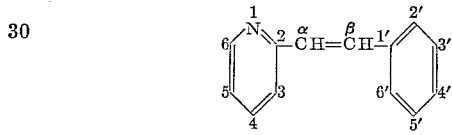

The aminostilbazole compounds employed as starting materials can be obtained by a variety of methods. For example, they can be obtained by reacting a benzonitrile compound of the formula

with the lithium derivative of 2-benzylpyridine under anhydrous conditions followed by mild hydrolysis of the reaction mixture with water or ammonium chloride solution; where $R_1$ and $R_2$ are as defined before.

The free bases of the invention form acid-addition salts with a variety of inorganic and organic acids. Pharmaceutically-acceptable acid-addition salts are formed by reaction with acids such as hydrochloric, hydrobromic, sulfuric, nitric, phosphoric, acetic, benzoic, citric, maleic, malic, gluconic, ascorbic and related acids. The pharmaceutically-acceptable acid-addition salts are essentially equivalent to the free bases for purposes of the invention and in certain applications are preferred because of their higher water solubility.

The compounds of the invention in both free base and acid-addition salt form are capable of existing as geometric or cis and trans isomers.

The compounds of the invention have useful pharmacological properties. They are hypocholesteremic agents which upon administration cause a decrease in blood cholesterol. They are also ovulation inhibitors, of value as anti-fertility agents. They are active upon oral administration but can also be given by the parenteral route if desired. One of the advantages of the compounds of the invention is their comparatively high chemical stability, as they are relatively resistant to oxidation and to hydrolysis, and form quite stable, water-soluble acid-addition salts.

The invention is illustrated by the following examples.

Example 1

A mixture of 28.6 g. of β-amino-2'-methyl-α-phenyl-2-stilbazole and 12.2 g. of salicylaldehyde is heated at 95–100° C. for two hours, cooled, and dissolved in a minimum quantity of hot 95 percent ethanol. The solution is chilled and the insoluble 2'-methyl-α-phenyl-β-salicylideneamino-2-stilbazole is collected on a filter; M.P. 186–190° C.

The acid sulfate salt is obtained by dissolving the free base in acetone and adding an equimolar amount of sulfuric acid. Following crystallization from ethanol-ethyl acetate, the product contains ethanol of crystallization and has M.P. 247–249° C. The nitrate salt is obtained in the same manner by reaction of the free base and nitric acid; it has M.P. 206–208° C. The dihydrogen phosphate salt is obtained in the same manner by reaction of the free base and 85 percent phosphoric acid; it has M.P. 238–239.5° C.

The starting material is obtained as follows. A solution of phenyllithium is prepared by adding a solution of 187 g. of bromobenzene in 500 ml. of anhydrous ether with vigorous stirring to 17 g. of lithium chips in 500 ml. of anhydrous ether. The mixture is maintained under reflux by regulating the rate of addition and is stirred for 30 minutes after the addition is complete. With continued stirring, a solution of 210 g. of 2-benzylpyridine in 500 ml. of anhydrous ether is added to the solution of phenyllithium at such a rate that the ether is maintained at reflux. The reaction mixture which now contains the lithium derivative of 2-benzylpyridine is stirred for one more hour and then a solution of 117 g. of o-methylbenzonitrile in 200 ml. of anhydrous ether is added. The mixture is heated under reflux for 12 hours, chilled, and stirred with 300 ml. of saturated aqueous ammonium chloride solution, added slowly and in small portions. The ether layer is separated, dried over anhydrous magnesium sulfate, and concentrated to give an oily residue of β-amino-2'-methyl-α-phenyl-2-stilbazole, the tautomeric form of which is 2-[α-(o-methylbenzimidoyl)benzyl]pyridine; B.P. 180–190° C. at 0.3 to 0.5 mm. For further purification, the compound can be crystallized from methanol; M.P. 76–80° C.

Example 2

A solution of 28.6 g. of β-amino-2'-methyl-α-phenyl-2-stilbazole and 17.2 g. of 2-hydroxy-1-naphthaldehyde in 100 ml. of ethanol is heated at reflux for three hours. The solution is concentrated by distillation until the product begins to separate and is then chilled. The insoluble β-(2-hydroxy-1-naphthylmethyleneamino)-2'-methyl-α-phenyl-2-stilbazole is collected on a filter; M.P. 187–188° C. following crystallization from ethanol.

Example 3

A solution of 28.6 g. of β-amino-2'-methyl-α-phenyl-2-stilbazole and 10.6 g. of benzaldehyde in 100 ml. of ethanol is heated at reflux for four hours. The reaction mixture is evaporated under reduced pressure to leave a residue of β-benzylideneamino-2'-methyl-α-phenyl-2-stilbazole. The acid sulfate salt is obtained by dissolving the free base in acetone and adding an equimolar amount of sulfuric acid; M.P. 280–281° C. following crystallization from ethanol-ethyl acetate.

Example 4

A mixture of 28.6 g. of β-amino-2'-methyl-α-phenyl-2-stilbazole and 12.0 g. of phenylacetaldehyde is heated at 95–100° C. for two hours. The product is 2'-methyl-α-phenyl-β-(2-phenylethylideneamino)-2-stilbazole. The acid sulfate salt is obtained by dissolving the free base in acetone and adding an equimolar amount of sulfuric acid; M.P. 242–244° C. following crystallization from ethanol-ethyl acetate.

Example 5

A solution of 30.0 g. of β-amino-2',5'-dimethyl-α-phenyl-2-stilbazole and 17.2 g. of 2-hydroxy-1-naphthaldehyde in 100 ml. of ethanol is heated at reflux for three hours. The solution is concentrated until the product begins to separate and is then chilled. The insoluble β-(2-hydroxy-1-naphthylmethyleneamino)-2',5'-dimethyl-α-phenyl-2-stilbazole is collected on a filter; following crystallization from ethanol, the product contains ethanol of crystallization and has M.P. 101–103° C.

The starting material is obtained as follows. 23 g. of 2-benzylpyridine is added to a solution of phenyllithium (prepared from 2.1 g. of lithium and 23 g. of bromobenzene in 100 ml. of ether) and the mixture is heated under reflux for one-half hour. A solution of 15.7 g. of 2,5-dimethylbenzonitrile in 100 ml. of ether is added and the mixture is heated under reflux for three more hours, cooled, and stirred with 250 ml. of ice water. The ether solution is separated, dried, and evaporated under reduced pressure to give a residue of crude β-amino-2',5'-dimethyl-α-phenyl-2-stilbazole, the tautomeric form of which is 2-[α-(2,5-dimethylbenzimidoyl)benzyl]-pyridine. For purification the product can be dissolved in ether, the solution chromatographed on alumina and the solid fractions recovered from the eluates; recrystallized from methanol, M.P. 91–93° C.

Example 6

A mixture of 30.0 g. of β-amino-2',5'-dimethyl-α-phenyl-2-stilbazole and 10.6 g. of benzaldehyde is heated at 95–100° C. for two hours. The resulting product is β-benzylideneamino - 2',5' - dimethyl-α-phenyl-2-stilbazole. The acid sulfate salt is obtained by dissolving the free base in ethanol and adding an equimolar amount of sulfuric acid. The product is isolated by diluting the mixture with ethyl acetate to the point of turbidity, chilling and collecting the precipitated salt on a filter; M.P. 286–287.5° C. following crystallization from ethanol-ethyl acetate.

Example 7

A mixture of 30.0 g. of β-amino-2',5'-dimethyl-α-phenyl-2-stilbazole and 12.2 g. of salicylaldehyde is heated at 95–100° C. for one hour. The resulting product is 2',5'-dimethyl-α-phenyl-β-salicylideneamino - 2 - stilbazole. The acid sulfate salt is obtained by dissolving the free base in ethanol and adding an equimolar amount of sulfuric acid. The product is isolated by diluting the mixture with ethyl acetate to the point of turbidity, chilling and collecing the precipitated salt on a filter. By crystallization from ethanol-ethyl acetate, the product contains ethanol of crystallization and has M.P. 256–257.5° C.

Example 8

A mixture of 31.8 g. of β-amino-2'-methylthio-α-phenyl-2-stilbazole and 12.2 g. of salicylaldehyde is heated at 95–100° C. for one hour. The mixture is cooled and dissolved in a minimum amount of hot 95 percent ethanol. The ethanolic solution is chilled and the insoluble 2'-methylthio-α-phenyl-β-salicylideneamino - 2 - stilbazole is collected on a filter; M.P. 183–184° C. following crystallization from ethanol.

The starting material is obtained as follows. 23 g. of 2-benzylpyridine is added to a solution of phenyllithium (prepared from 2.1 g. of lithium and 23 g. of bromobenzene in 100 ml. of ether) and the mixture is heated under reflux for one-half hour. A solution of 17.9 g. of o-methylthiobenzonitrile in 100 ml. of ether is added and the mixture is heated under reflux for three more hours, cooled, and stirred with 250 ml. of ice water. The ether solution is separated, dried, and evaporated under reduced pressure to give a residue of crude β-amino-2'-methylthio-α-phenyl-2-stilbazole, the tautomeric form of which is 2-[α-(o-methylthiobenzimidoyl)benzylpyridine. For purification the product can be dissolved in ether, the solution chromatographed on alumina and the solid fractions recovered from the eluates; recrystallized from methanol, M.P. 163–165° C.

*Example 9*

A solution of 31.8 g. of β-amino-2′-methylthio-α-phenyl-2-stilbazole and 17.2 g. of 2-hydroxy-1-naphthaldehyde in 100 ml. of ethanol is heated at reflux for two hours. The solution is concentrated until an insoluble product begins to separate and is then chilled. The insoluble product, β-(2-hydroxy-1-naphthylmethyleneamino)-2′-methylthio-α-phenyl-2-stilbazole, is collected on a filter; M.P. 180–182° C. following crystallization from ethanol.

I claim:
1. A member of the class consisting of compounds of the formula

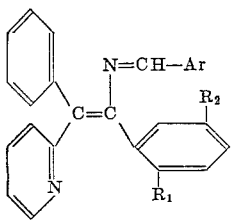

and acid-addition salts thereof; where Ar is a member of the class consisting of phenyl, o-hydroxyphenyl, benzyl, and 2-hydroxy-1-naphthyl; $R_1$ is a member of the class consisting of methyl and methylthio; and $R_2$ is a member of the class consisting of hydrogen and methyl.

2. 2′ - methyl - α - phenyl - β - salicylideneamino - 2 - stilbazole.

3. β - benzylideneamino - 2′ - methyl - α - phenyl - 2 - stilbazole.

4. 2′ - methyl - α - phenyl - β - (2 - phenylethylideneamino)-2-stilbazole.

5. β - (2 - hydroxy - 1 - naphthylmethyleneamino) - 2′-methyl-α-phenyl-2-stilbazole.

References Cited by the Examiner

UNITED STATES PATENTS 2,422,013   6/1947   Haury et al. _____ 260—570 X

OTHER REFERENCES

Adamson et al.: J. Chem. Soc., 1958, pp. 312–320.
Chemical Abstracts, vol. 57, col. 2405 (July 1962).

JOHN D. RANDOLPH, *Primary Examiner.*